US006811821B2

(12) United States Patent
Maxwell et al.

(10) Patent No.: US 6,811,821 B2
(45) Date of Patent: Nov. 2, 2004

(54) BARRIER COATINGS

(75) Inventors: Jeffrey W. Maxwell, White Lake, MI (US); Xenophon George Saquet, Troy, MI (US)

(73) Assignee: J & G Chemical Specialities, LLC, White Lake, MI (US)

( * ) Notice: Subject to any disclaimer, the term of this patent is extended or adjusted under 35 U.S.C. 154(b) by 0 days.

(21) Appl. No.: 10/113,435

(22) Filed: Mar. 29, 2002

(65) Prior Publication Data

US 2002/0174914 A1 Nov. 28, 2002

Related U.S. Application Data

(60) Provisional application No. 60/280,036, filed on Mar. 30, 2001.

(51) Int. Cl.$^7$ .............................. B05D 3/02; B05D 1/02
(52) U.S. Cl. ................................ 427/376.2; 427/427
(58) Field of Search .............................. 427/376.2, 427

(56) References Cited

U.S. PATENT DOCUMENTS

| 2,377,048 A | * | 5/1945 | Smith ........................ 148/26 |
| 2,695,943 A | | 11/1954 | Cape et al. ..................... 219/8 |
| 3,981,753 A | * | 9/1976 | Hopper ....................... 148/23 |
| 4,532,403 A | | 7/1985 | Jordan et al. ................ 219/121 |
| 4,662,558 A | | 5/1987 | Hamanaka ................. 228/118 |
| 4,861,392 A | * | 8/1989 | Grabe ......................... 148/23 |
| 4,947,024 A | * | 8/1990 | Anderson ............... 219/137.61 |
| 5,300,142 A | | 4/1994 | Cormier .................. 106/14.14 |
| 5,603,854 A | | 2/1997 | Parry ........................ 219/137 |
| 5,837,078 A | | 11/1998 | Lowe ........................ 106/10 |

FOREIGN PATENT DOCUMENTS

| JP | 56074379 A2 | 6/1981 | ............ B23K/9/32 |
| JP | 57160591 A2 | 10/1982 | ........... B23K/31/00 |
| JP | 57195599 A2 | 12/1982 | ........... B23K/35/36 |
| JP | 58041693 A2 | 3/1983 | ........... B23K/35/36 |
| JP | 58128296 A2 | 7/1983 | ......... B23K/35/365 |
| JP | 58138577 A2 | 8/1983 | ............ B23K/9/32 |
| JP | 58181495 A2 | 10/1983 | ........... B23K/35/22 |
| JP | 59150666 A2 | 8/1984 | ............ B23K/7/10 |
| JP | 59193772 A2 | 11/1984 | ............ B23K/9/32 |
| JP | 61132293 A2 | 6/1986 | ........... B23K/31/00 |
| JP | 62212097 A2 | 9/1987 | ........... B23K/37/04 |
| JP | 63076792 A2 | 4/1988 | ........... B23K/35/36 |
| JP | 63137581 A2 | 6/1988 | ............ B23K/9/26 |
| JP | 2215869 A2 | 8/1990 | ............ C09D/5/18 |
| JP | 3086391 A2 | 4/1991 | ........... B23K/35/36 |

OTHER PUBLICATIONS

"Splatter Juice" internet page, Kerico Diversified Inc. (Oct. 2000).
"Problems & Solutions" internet pages (pp. 1–5), Weld–Aid (Sep. 2000).
"Weldgear—Accessories" internet pages (pp. 1–5), Welding Industries of Australia (Jul. 2000).
"Spatter Block" internet pages (pp. 1–2), Walter Co. (Jul. 2000).
"Liquidtools" internet pages (pp. 1–2) (Jul. 2000).
MSDS, Weld Release–25 (pp. 1–4) (Nov. 1999).
MSDS, Spatter Release White (pp. 1–4) (Nov. 1999).
MSDS, Spatter Release Green (pp. 1–6) (Apr. 1999).
MSDS, Econogard (pp. 1–5) (Nov. 1999).
MSDS, Gun Nozzle Release (pp. 1–6) (Nov. 1999).

* cited by examiner

*Primary Examiner*—Michael Barr
(74) *Attorney, Agent, or Firm*—MacMillan, Sobanski & Todd, LLC

(57) ABSTRACT

The invention relates to a method of preventing a material from adhering to a surface. In a preferred embodiment, the material comprises weld spatter and the surface is located near a welding operation. The method comprises coating the surface with a slurry comprising a mineral material in water. The slurry contains from 10% to 70% solids by weight and not more than 5% by weight of a material that decomposes when heated to 1000° F. for one minute. The slurry is allowed to dry to form a barrier coating before the material contacts the surface.

20 Claims, No Drawings

BARRIER COATINGS

CROSS-REFERENCE TO RELATED APPLICATION

This application claims the benefit of U.S. provisional application Ser. No. 60/280,036, filed Mar. 30, 2001.

BACKGROUND OF THE INVENTION

This invention relates in general to barrier coatings, and in particular to a welding machine maintenance coating that prevents the adhesion of weld spatter on the welding machine and other areas where weld spatter is a problem. This coating often prevents the buildup of weld slag, and when buildups of weld slag occur, it makes for easy clean up of weld slag off welding machines and areas where weld spatter causes a buildup of weld slag.

Automated and robotic controlled welding is often used in the assembly of a product. In the process of welding, molten metal often flies away from the welding location. This molten metal is commonly referred to as weld spatter. When this molten metal cools, it is commonly referred to as weld slag. In automated or robotic controlled spot welding, weld spatter is often produced which can fly as far as fifty feet from the welding location. This weld spatter often flies in the same direction producing buildups of weld slag on automated machinery. Often automated or robotic controlled welders are manufactured to tight dimensional tolerances and these buildups of weld slag often accumulate enough to produce out of specification parts and/or prevent the welding machine from operating. This produces costly quality issues, production downtime and requires maintenance to remove the weld slag off the welding machine. Weld slag is commonly removed by wire brushing, scraping, prying, chiseling, and grinding. This is often a very labor intensive, tedious, and time consuming process which often creates further breakdowns on the automated welding machinery.

Currently available weld anti-spatter products are formulations using organic materials for release agents. A very common weld spatter release coating is based on soy lecithin and soybean oil or other vegetable oils. This product is often supplied in aerosol cans pressurized with methylene chloride or $CO_2$. The product is typically sprayed on the metal to be welded or on the welding nozzle to prevent the adhesion of weld spatter to the nozzle. Other common weld anti-spatter materials are gel products that are often petrolatum or thickened lecithin or vegetable oils. Another weld anti-spatter product is described in U.S. Pat. No. 4,861,392 to Grabe where a typical composition is composed as follows. 5–6% micronized graphite, 51–60% limestone, 34–38% water, 0.5–1% morpholine, 0.2–0.4% polysorbate 80, 0.2–1.0% potassium alginate, 0.02–1.2% Natrosol LR70, and 0.01–1.0% Kelzan. These products are somewhat effective but have two major drawbacks. First, they are only effective for a limited period mainly because they decompose. Second, in the process of decomposition, the products produce noxious odors, fumes, and smoke. Since weld spatter is composed of molten iron metal, being at approximately 1300° C. the weld spatter readily decomposes organic materials producing noxious decomposition products. Since there is usually only general ventilation in these areas, these noxious fumes can make production workers ill. For these health and safety reasons and their limited time of effectiveness, the current weld-spatter products have not gained acceptance for use as a maintenance coating for automated welding machinery. Currently there is a need in the automated welding industry for an effective weld maintenance coating that will reduce or eliminate down time related to weld slag for extended periods of time and be free of producing noxious odors.

SUMMARY OF THE INVENTION

This invention relates to a method of preventing a material from adhering to a surface. In a preferred embodiment, the material comprises weld spatter and the surface is located near a welding operation. The method comprises coating the surface with a slurry comprising a mineral material in water. The slurry contains from about 10% to about 70% solids by weight and not more than about 5% by weight of a material that decomposes when heated to 1000° F. for one minute. The slurry is allowed to dry to form a barrier coating before the material contacts the surface.

In another embodiment of the invention, the barrier coating binds to the surface such that from about 50 to about 200 finger double rubs are required to reach the surface when the dry barrier coating is 30 microns thick.

In another embodiment of the invention, the barrier coating dries in a time not longer than about 20 minutes when the slurry is applied as a 250 micron thick wet film and with the temperature at 72° F. and air moving over the film at 110 feet per minute.

Various advantages of this invention will become apparent to those skilled in the art from the following detailed description of the preferred embodiments, when read in light of the accompanying drawings.

DETAILED DESCRIPTION OF THE PREFERRED EMBODIMENTS

An effective welding machine maintenance coating for weld slag buildup will accomplish the following:
1. Prevent hot weld spatter from adhering to welding machinery and areas affected by buildup of weld slag.
2. Provide easy removal of weld slag off machinery and other areas were it has built up.
3. Be effective until next scheduled maintenance time. Maintenance schedules vary considerably and the major affectors are: how much use the welding machinery receives and, the amount of weld spatter produced. This ranges from daily maintenance to weekly or bi-weekly to three months. Typically, most machinery requires maintenance somewhere between one week to three months.
4. Be easily applied. Automated welding machines are usually very complex and an easy application is necessary. Spray application is the preferred method. Brush application would be very tedious.
5. Produce no noxious odors or fumes when hot weld spatter hits the weld maintenance coating. Noxious fumes produced can make production workers ill. This is a concern since most automated welding machines are operated in areas with only general ventilation.
6. Have quick dry time. Often the production plant only has time to apply the maintenance coating on weekends. Ideally, the weld maintenance coating should be dry within an hour of application.
7. Coating should be easily removed with the weld slag for the next application of the maintenance coating. Some methods of removing the coating include wire brushing, scraping, wiping with a cloth wetted with water, use of cleaning machinery such as $CO_2$ ice blasting machines, steam cleaning machines, or water cleaning with pressure washers. The property of the coating being removable and somewhat powdery is an attribute that helps the removal of large weld spatter build ups giving an area of release between the substrate and the built up weld-slag. This is especially important in areas where there is a lot of mechanical adhesion to the substrate such as electrical cables and cooling lines. Conversely, permanent films would not provide the easy release. In addition, permanent films after many repeated applications would eventually build up on areas of the machine, and over time cause the same problems as the build up of weld slag.

It has been discovered that certain minerals or combinations of minerals when applied in an aqueous slurry form upon drying will form a barrier coating that meets at least most of the requirements mentioned above for a welding machine maintenance coating, and preferably substantially all of the requirements.

The present invention is a method of preventing a material from adhering to a surface. Preferably, the material is weld spatter, and the surface is located near a welding operation. However, the method can also be used to prevent other materials from adhering to surfaces. The method comprises coating the surface with a slurry comprising a mineral material in water. By "mineral material" is meant one or more minerals, and preferably a combination of more than one mineral as disclosed below. The slurry contains from about 10% to about 70% solids by weight, and preferably from about 25% to about 40% solids by weight. The slurry is allowed to dry to form a barrier coating before the material contacts the surface. Preferably, the slurry has a rheology that prevents it from sagging or running on vertical surfaces when applied at a temperature of 72° F.

In a first embodiment of the invention, the slurry contains not more than about 5% by weight of a material that decomposes when heated to 1000° F. for one minute, preferably not more than about 3%, and more preferably not more than about 1%. Most preferably, the dried barrier coating has substantially no decomposition when heated to 1000° F. for one minute. Preferably, the slurry contains not more than about 5% by weight of a material that fumes or smokes when heated to 1000° F. for one minute, more preferably not more than about 3%, and more preferably not more than about 1%. Most preferably, the dried barrier coating produces substantially no fumes or smoke when heated to 1000° F. for one minute. Organic materials are examples of materials that would be likely to decompose and produce fumes/smoke at this temperature.

Certain types of minerals are preferred for use in the slurry. In one embodiment, the mineral solids portion of the slurry contains from about 1% to about 90% by weight of minerals selected from the group consisting of aluminum tri-hydroxide, magnesium hydroxide, graphite, hexagonal boron nitride, and mixtures thereof. In another embodiment, the mineral solids portion of the slurry contains from about 10% to about 80% by weight of minerals selected from the group consisting of sodium magnesium aluminosilicate, diatomaceous earth, pumice, amorphous silica, and mixtures thereof. In another embodiment, the mineral solids portion of the slurry contains from about 10% to about 80% by weight of minerals selected from the group consisting of calcium carbonate, calcined clay, delaminated kaolin clay, kaolin clay, talc, and mixtures thereof.

Other minerals and other materials are disfavored for use in the slurry. In one embodiment, the mineral solids portion of the slurry contains less than about 20% by weight of minerals selected from the group consisting of hydrous sodium polysilicate, sodium meta-silicate pentahydrate, potassium meta-silicate pentahydrate, and mixtures thereof. In another embodiment, the slurry contains less than about 2% by weight of a material selected from the group consisting of zinc phosphate, aluminosilicate, calcium metasilicate, and mixtures thereof. In another embodiment, the slurry contains less than about 5% by weight of a material selected from the group consisting of wax emulsion, lecithin, ethyleneoxide/propyleneoxide block polymers, ethyl polysilicates, and mixtures thereof. Preferably, the slurry contains substantially no organic solvent.

In a second embodiment of the invention, the barrier coating binds to the surface such that from about 50 to about 200 finger double rubs (as described below) are required to reach the surface when the dry barrier coating is 30 microns thick. If fewer double rubs are required, the barrier coating is too easy to remove from the surface so that it would not be effective for a desired length of time. If more double rubs are required, the barrier coating adheres to strongly to the surface and cannot be easily removed.

In a third embodiment of the invention, the barrier coating dries in a time not longer than about 20 minutes when the slurry is applied as a 250 micron thick wet film and with the temperature at 72° F. and air moving over the film at 110 feet per minute. More preferably, the barrier coating dries in not longer than about 15 minutes, and most preferably not longer than about 10 minutes.

The following materials and combinations thereof can be useful in the weld maintenance coatings of the invention:

Minerals weld spatter does not adhere to:
   a. Aluminum tri-hydroxide (AC712AN from Aluchem), magnesium hydroxide (Magchem MH 10 from Martin Marietta), graphite (Graphite 1107 from Asbury graphite), Hexagonal BN (from Carborundum)
   b. Weld spatter adheres slightly: aluminosilicate (TurboBrite from PQ Corporation), calcium carbonate (Multiflex MM from Specialty Minerals), diatomaceous earth (Diafil 570 from CR minerals Corporation), kaolin clay (Wilklay RP-80, Wilklay RP-2 from Wilkinson Klay), delaminated kaolin clay (Polyplate 90 and Polyplate HMT from J M Huber), pumice (Pumice 5 u from Hess Pumice), sodium magnesium aluminosilicate, sodium aluminosilicate (Zeolex 94HP, Zeolex 98 from J M Huber)

Minerals with natural binding properties:
   Calcium carbonate (Multiflex MM from Specialty minerals or Socal 31 from Solvay), calcined clay (Huber 2000C from J M Huber), delaminated kaolin clay (Polyplate 90 and Polyplate HMT from J M Huber), sodium magnesium aluminosilicate, sodium aluminosilicate (Zeolex 94HP, Zeolex 98 from J M Huber), kaolin clay (Wilklay RP-80), talc (Ultratalc 609 from Specialty Minerals)

Minerals with fast dry time:
   a. Less than 10 minutes (30% solution solids 250 micron dry time) Sodium magnesium aluminosilicate, sodium aluminosilicate (Zeolex 94HP, Zeolex 98 from J M Huber), diatomaceous earth (Diafil 570 from CR Minerals Corporation), magnesium hydroxide (Magchem MH10 from Martin Marietta), pumice (Pumice 5 u from Hess Pumice)
   b. Less than 15 minutes (30% solution solids 250 micron dry time) aluminum tri-hydroxide (AC712AN from Aluchem)

Rheology control agents:
   a. Anti-sagging, anti-settling and anti-synersis agents; Bentone EW (Rheox), Multiflex MM-Socal 31, (Specialty Minerals-Solvay Minerals), Veegum B (R. T.

Vanderbilt), Laponite RDS, Optibent M602 (Sud-Chemie), Cabosil M-5, Attagel 50 (Engelhard)

b. Modify for spraying, brushing & rolling
Natrosol 330A (modified hydroxyethycellulose from Hercules), Acrysol TT-615 (polyacrylic acid thickener from Rohm and Hass)

c. Over-spray control
High molecular weight polyethylene oxide polymer (Polyox 308 from Union Carbide), Cyanamer A-370 (polyacrylamide from Cytec Industries)

Fire retarding/smoke retarding ingredients:
a. Aluminum tri-hydroxide, borax, magnesium hydroxide, antimony oxide Anti-bacterial/anti-fungal additives:
a. CS-1135 from Angus chemical; Troysan 096, Proxel GXL Binding agents:
a. Inorganic binders: hydrous sodium and potassium polysilicates ranging from 1.0 to 3.22 mole ratio of $SiO_2/Na_2O$ for sodium polysilicates and 1.6 to 2.5 mole ratio of $SiO_2/K_2O$ (available from PQ Corporation).
b. Organic binding agents: wax emulsions Michelman 43040 (Michem Emulsions), lecithin, ethyleneoxide/propyleneoxide block polymers (Pluronics from BASF), ethyl polysilicates (Sibond 40 from Huls AG)

Defoamers and deaerators:
Colloid 640 (defoamer from Rhodia), Foamaster 111 (defoamer from Cognis additives)

Colorants for product:
Iron oxides: Mapico 218M red iron oxide and Mapico 2150 yellow iron oxide (from Laporte Pigments red, yellow and black iron oxides)
Graphite, carbon black, and ceramic pigments from Ferro Corporation Freeze prevention:
Ethylene glycol, propylene glycol, MP-Diol, glycerin Anti skinning agents:
Propylene glycol, ethylene glycol, MP-Diol, glycerin Dispersing agents:
a. Inorganic: Hydrous sodium polysilicate (Britesil C20), trisodium phosphate, tetra potassium pyrophosphate (Solutia)
b. Organic: Nopcosperse 44, Tamol 731, lecithin Flash rust and corrosion inhibitors:
a. Flash rusting, CS 1135 from Angus Chemical,
b. Corrosion inhibitor: J-0806 zinc phosphate from Laporte Pigments.

Other materials that can be useful in the weld maintenance coatings of the invention can be found in reference materials relating to coatings, such as in "Paint and Coatings Raw Materials Handbook" authored by Michael and Irene Ash, or other similar handbooks.

The weld maintenance coating is applied to the welding machine by any suitable method. The welding machine to be coated is well cleaned removing as much weld slag as possible. The weld maintenance coating is applied to the machine, especially in areas of high weld slag build up. The coating is typically spray applied. Air atomized, airless, air-assisted airless and high volume low pressure atomizing equipment can be used to apply the coating to the machine. A dry film of 20–120 micron (130–800 microns wet) is the preferred dry film application thickness, more preferably from 30–60 micron dry films (200–400 microns wet). All electronic position sensors, welding tips and if preferred part locator pins are wiped clean before the coating dries. After the coating is dry the machine may be used. After weld slag has again built up on the machine, the weld slag is removed by wire brushing, scraping, prying, or chiseling. The weld maintenance coating is removed along with the weld slag. The weld maintenance coating is reapplied repeating the above maintenance cycle.

EXAMPLES

The following examples for the welding machine maintenance coating were evaluated by MIG welding over steel panels producing weld spatter that adhered to the steel panel that can only be removed by grinding. The spatter produced was also allowed to contact the maintenance coating on the steel panel.

| Ingredients | A | B | C | D | E | F | G |
|---|---|---|---|---|---|---|---|
| Water | 69.11 | 69.48 | 75.81 | 60.52 | 69.75 | 55.60 | 46.80 |
| Britesil C20 | | | | 4.63 | 0.53 | 10.66 | 37.60 |
| Bentone EW | 1.26 | 0.74 | 1.63 | | 0.85 | 1.48 | |
| Laponite RDS | | | | | 0.32 | | |
| Cabosil M-5 | | | | | | | 0.94 |
| Natrosol Plus 330 | | | | 0.19 | | | |
| CS-1135 | | | 0.16 | .08 | 0.11 | .09 | 0.09 |
| Colloid 640 defoamer | | | | 0.21 | | .08 | 0.12 |
| Igepal CO-630 | | | 0.32 | 0.27 | | | |
| Lecithin | | | 2.23 | | | | |
| Rhodopon BOS | | | | | | | 0.38 |
| Zeolex 94HP | | | | 20.24 | 25.71 | 17.25 | |
| Ac-712AN | 29.62 | | | 10.25 | 1.27 | 8.70 | 17.07 |
| Magchem MH10 | | 29.78 | | | | | |
| Multiflex MM | | | | 2.83 | | 2.46 | |
| Hubercarb Q-6 | | | 4.96 | | | | |
| J-806 Zinc Phosphate | | | | 0.80 | 0.25 | 0.7 | |
| Vansil W-30 | | | | | 0.88 | | |
| Wilklay RIP-80 | | | 14.88 | | | | |
| Mapico 218 Red iron oxide | | | | | 0.17 | | |
| Mapico 2150 Yellow iron oxide oxide | | | | | 0.13 | | |

-continued

| Ingredients | A | B | C | D | E | F | G |
|---|---|---|---|---|---|---|---|
| Raven H20 Carbon black | | | | | 0.01 | | |
| Black Iron Oxide HB 1033T | | | | | | 2.98 | |
| Total | 100 | 100 | 100 | 100 | 100 | 100 | 100 |

In example A, water and Bentone EW were added and mixed thoroughly for 15 minutes on a cowles disperser. The mineral aluminum tri-hydroxide (AC712AN from Aluchem) was added and mixed under good mixing. The material had a viscosity of 78 KU (Krebs units) and pH of 9.82. A 250 micron wet film dries in 15 minutes. The binding properties of a wet film of 200 microns cast on a 6 inch by 12 inch by 0.032 inch unpolished bare steel panel gives a dry film of approximately 30 microns. This dry film takes 50 finger double rubs to get to the substrate. For the purpose of this invention binding properties are defined by using a double rub process similar in procedure to ASTM D5402 MEK Double Rubs, commonly used to determine the cure or solvent resistance of an organic coating film where you would soak a cloth with MEK (methyl ethyl ketone) and double rub the lacquer coating by hand until you reached the substrate, then record the number of double rubs. Finger double rubs recorded is the number of rubs required to rub through the coating to the substrate with no solvent or water used.

In example B, water and Bentone EW were added and mixed thoroughly for 15 minutes on a cowles disperser. The mineral magnesium hydroxide (Magchem MH10 from Martin Marietta) was added and mixed under good mixing. Example B had a viscosity of 65 KU (Krebs Units) and a pH of 10.1. A 250 micron wet film dries in 10 minutes. The dry film of approximately 30 microns takes 20 finger double rubs to get to the substrate. From observation, films that can withstand spatter impact and still be easily removable by brushing or scraping rub down to the substrate with 50 to 200 finger double rubs at 30 microns dry film. Films that have less than 50 finger double rubs are too powdery to withstand much spatter impact for extended periods of time.

In examples A and B, these materials produced barrier coatings that weld spatter did not adhere to. That is, the weld spatter on the coating is easily removed with no cohesive removal of the coating. Heating the steel panel (with the coating applied) with a propane torch until red-hot (approximately 1000 F for one inch diameter spot) for about a minute did not produce any fumes or smoke. When the films were drying they caused flash rusting of the steel. Flash rust is an oxidation of the steel that occurs, within minutes, as the water or water-borne coating is drying. The slurries would upon setting separate into phases.

In the following example C, an organic dispersant/binding agent was used (lecithin). Water and Bentone EW were added, mixed thoroughly for fifteen minutes, and the wetting agent, dispersant/binding agent and antibacterial were added (Igepal CO-630, lecithin, and CS-1135 respectively). The minerals Hubercarb Q6 (calcium carbonate from J M Huber) and Wilklay RP-80 (kaolin clay from Wilkinson Klay) were added and mixed under high shear. Example C had a viscosity of 61 KU (Krebs Units) and pH of 8.79. A 250 micron wet film dries in 24 minutes (68° F. , 110 feet per minute average air flow, 42% humidity). The binding property of a film of approximately 30 microns dry film takes 43 finger double rubs to get to the substrate. The weld spatter adhered very slightly to the areas of the panel coated with the above coating. What is meant by very slight adhesion is the weld spatter would come off the coated substrate easily but there would be some cohesive removal of the coating with the weld spatter. Some unpleasant fumes were produced upon heating a coated steel panel with a propylene torch until red-hot.

Example C is marginally acceptable as a weld maintenance coating. It's on the borderline of acceptability for odor, weld spatter adhesion, film binding properties, product dry time, flash rusting of steel, and shelf stability. Example C is close to the upper limit of organic content that is acceptable in a weld maintenance coating. (Example C has 2.71% by weight of organic material.) For this invention what is described as organic material is anything that is known to decompose or combust producing noxious fumes to 1300C. The film is almost acceptable for film binding properties, being somewhat powdery giving 43 finger double rubs to the substrate. The dry time of 24 minutes for 250 microns with moving air (110 feet per minute) is marginal for in practice wet films of 1000 microns can be applied in areas on machinery. At 1000 microns wet film the dry time extrapolates to 96 minutes with moving air. 96 minutes is much longer than the typical dry time window of one hour. Also often, there is very little moving air around the welding machinery. Lack of air movement extends the dry time considerably. For example, this same material at the same temperature and humidity with air flow less than 5 feet per minute has a 45-minute dry time for a 180-micron wet film. This would extrapolate to a 4-hour dry time for a 1000 micron wet film, which is unacceptable. This material produced some light flash rusting on steel. It contains no flash rust inhibiting minerals. Upon setting, this material would separate into two phases with a clear liquid phase on the surface of the unmixed material. It is desirable to have a one-phase material that would not require mixing before use.

In example D, this formulation contains minerals that in our testing provide fast dry at room temperature with good binding properties (sodium magnesium aluminum silicate Zeolex 94HP), is a higher solids formulation which speeds up dry time, and uses sodium polysilicate (britesil C20 from PQ Corporation) as an inorganic binding agent/ dispersant for the film. For weld spatter release it uses aluminum tri-hydroxide (AC712AN from Aluchem), and for flash rusting of metal the corrosion inhibitor zinc phosphate is used. For rheology control and stability Natrosol Plus 330 (Hercules) and Multiflex MM from Specialty Minerals (or an equivalent such as Socal 31 from Solvay minerals) are used. In can preservatives to prevent bacterial and fungal growth (CS-1135 from Angus chemical), and a defoamer (Colloid 640 from Rhodia) are also used.

In example D, water, Natrosol plus 330, CS 1135, Igepal CO-630, and Colloid 640 were added under agitation to a high shear cowles disperser. The minerals Zeolex 94 HP, AC712AN, Multiflex MM, and J-0806 Zinc Phosphate were added and mixed with high shear with a cowles disperser. Example D had a viscosity of 80 KU (Krebs Units), a pH of 11.78, and a rheology that prevents the material from sagging or running on vertical services when applied. The sagging test is performed by applying a 200 micron wet coating film to a steel panel, drawing a streak through the wet film with a pencil eraser, then setting the panel up vertically and observing if the wet coated film runs down the panel past the streak produced with the pencil eraser. The coating passes the test when the wet film stays above the streak produced with the eraser. A 250 micron wet film dries in 20 minutes (74° F. , <5 feet per minute average air flow, 39% Humidity). The binding property of a film of approximately 30 microns dry film takes 120 finger double rubs to get to the substrate. The weld spatter adhered very slightly to the areas of the panel coated with the above coating. Some slight fumes were produced upon heating a coated steel panel with a propylene torch until red-hot. In comparison to example C, the fumes were much less in odor and quantity. The total organic content of this formulation is 0.66%.

In example E, this formulation is a more complete formulation addressing issues of odor (very little organic content (0.11% CS-1135)), weld spatter adhesion (Ac-712AN), film binding properties, product dry time, flash rusting of metal (zinc phosphate and calcium meta silicate), rheology control and stability (Bentone EW, Laponite RDS), in can preservatives to prevent bacterial and fungal growth (CS 1135), and colorants (red and yellow iron oxides and carbon black) for the product. Water, britesil C20, Bentone EW, Laponite RDS (from Southern Clay Products) and CS-1135 were added then mixed for a half hour with good shear mixing with a cowles disperser mixer. Zeolex 94HP, AC-712AN, J-0806 zinc phosphate, and Vansil W-30 were added under good high shear mixing. The colorants were also added to give a brown color. Example E has a viscosity of 84 KU (Krebs units) and rheology that prevents the material from sagging or running on vertical services when applied. Other physical properties are a pH of 11.78 and the material has a light brown color. A 250 micron wet film dries in 7 ½ minutes (73° F. 90 feet per minute average air flow, 39% humidity). The binding properties of a wet film of 200 microns cast on a 6 inch by 12 inch unpolished bare steel panel gives a dry film of approximately 30 microns. It takes 200 finger double rubs to get to the substrate. MIG welding over this steel panel produced weld spatter that adhered to the steel panel that can only be removed by grinding. The weld spatter did not adhere to the areas of the panel coated with the above coating. No noticeable fumes or smoke was produced on heating a coated steel panel with a propylene torch until red-hot.

In example F, a higher solids formulation addresses issues of odor (very little organic content 0.17%), weld spatter adhesion (Ac-712AN), flash rusting of metal (zinc phosphate), rheology control and stability (Bentone EW, ), in can preservatives to prevent bacterial and fungal growth (CS 1135), and colorants (black iron oxide HB1033T from Hoover Color Corporation) for the product. Water, Zeolex 94HP, AC-712AN, Multiflex MM, J-0806 zinc phosphate, black iron oxide HB1033T, CS-1135, and Colloid 640 were added then mixed for a half hour with good shear mixing with a cowles disperser mixer. Bentone EW and Britesil C2.0 were added under good high shear mixing. Example F has a viscosity of 72 KU (Krebs units) and rheology that prevents the material from sagging or running on vertical surfaces when applied. Other physical properties are a pH of 11.50 with a gray color upon drying. A 250 micron wet film dries in 6 minutes (73° F. 90 feet per minute average air flow, 59% humidity). The binding properties of a wet film of 200 microns cast on a 6 inch by 12 inch unpolished bare steel panel gives a dry film of approximately 30 microns. It takes 200 finger double rubs to get to the substrate. MIG welding over this steel panel produced weld spatter that adhered to the steel panel that can only be removed by grinding. The weld spatter did not adhere to the areas of the panel coated with the above coating. No noticeable fumes or smoke was produced on heating a coated steel panel with a propylene torch until red-hot.

Example F was also spray applied to welding machinery using high volume low pressure spray equipment. It took 13 minutes to spray apply the coating. The coating was dry to touch in 20 minutes at 70° F. , 77% humidity with air movement ranging from 50–130 FPM. This coating was found to slow the build up of weld spatter and what spatter that did build up was found to be easily removable. Four months after coating application with the welding machinery in production use the coating was still providing weld spatter release by slowing the buildup of weld spatter.

In example G, this formulation is translucent (semi-transparent) allowing the colors of painted portions of the automated machinery to remain visible. Water, Britesil C20, Cabosil M-5 (Cabot Corporation), CS-1135, Colloid 640, Rhodopon BOS (Rhone poulenic),and AC-712AN were added then mixed for a half hour with good shear mixing with a cowles disperser mixer. Example G has a viscosity of 60 KU (Krebs units). It has an organic content of 0.59% of the formulation. Other physical properties are a pH of 11.7, and the material is a white liquid drying to a translucent film where color markings are still visible through the film. A 250 micron wet film dries in 30 minutes. The binding properties of a wet film of 200 microns cast on a 6 inch by 12 inch unpolished bare steel panel gives a dry film of approximately 30 microns. It takes more than 200 finger double rubs to get to the substrate. At 200 finger double rubs the substrate was only slightly rubbed away. MIG welding over this steel panel produced weld spatter that adhered to the steel panel that can only be removed by grinding. The weld spatter did not adhere to the areas of the panel coated with the above coating. No noticeable fumes or smoke was produced on heating a coated steel panel with a propylene torch until red-hot.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope. For example, although this invention has been described primarily in terms of a welding machine maintenance coating, the invention is not limited to use on welding machines. Rather, the invention is a barrier coating which is useful for coating any surface to prevent the adhesion of an unwanted material on the surface. Some nonlimiting examples of uses for the barrier coating include preventing any type of material that cures up or otherwise solidifies on a surface from adhering to the surface, such as adhesives, sealers, solders, brazing compounds, and others.

We claim:

1. A method of preventing a material from adhering to a surface, the method comprising:

coating the surface with a slurry comprising a mineral material in water, the slurry containing from about 10% to about 70% solids by weight and not more than 1% by weight of a material that fumes or smokes when heated to 1000° F. for one minute; and allowing the slurry to dry to form a barrier coating before the material contacts the surface, the barrier coating binding to the surface such that at least about 15 finger double rubs are required to reach the surface when the dry barrier coating is 30 microns thick.

2. A method according to claim 1 wherein the dried barrier coating has substantially no decomposition when heated to 1000° F. for one minute.

3. A method according to claim 1 wherein the mineral solids portion of the slurry contains from about 1% to about 90% by weight of minerals selected from the group consisting of aluminum tri-hydroxide, magnesium hydroxide, graphite, hexagonal boron nitride, and mixtures thereof.

4. A method according to claim 1 wherein the mineral solids portion of the slurry contains from about 10% to about 80% by weight of minerals selected from the group consisting of sodium magnesium aluminosilicate, diatomaceous earth, pumice, amorphous silica, and mixtures thereof.

5. A method according to claim 1 wherein the mineral solids portion of the slurry contains from about 10% to about 80% by weight of minerals selected from the group consisting of calcium carbonate, calcined clay, delaminated kaolin clay, kaolin clay, talc, and mixtures thereof.

6. A method according to claim 1 wherein the mineral solids portion of the slurry contains less than about 20% by weight of minerals selected from the group consisting of hydrous sodium polysilicate, sodium meta-silicate pentahydrate, potassium meta-silicate pentahydrate, and mixtures thereof.

7. A method according to claim 1 wherein the slurry contains less than about 5% by weight of a material selected from the group consisting of wax emulsion, lecithin, ethyleneoxide/propyleneoxide block polymers, ethyl polysilicates, and mixtures thereof.

8. A method according to claim 1 wherein the slurry contains less than about 2% by weight of a material selected from the group consisting of zinc phosphate, aluminosilicate, calcium metasilicate, and mixtures thereof.

9. A method according to claim 1 wherein the slurry is sprayable.

10. A method according to claim 1 wherein the slurry has a rheology that prevents the slurry from sagging or running on vertical surfaces when applied at a temperature of 72° F.

11. A method according to claim 1 wherein the slurry contains substantially no organic solvent.

12. A method of preventing a material from adhering to a surface, the method comprising:
coating the surface with a slurry comprising a mineral material in water, the slurry containing from about 10% to about 70% solids by weight and not more than 1% by weight of a material that fumes or smokes when heated to 1000° F. for one minute; and
allowing the slurry to dry to form a barrier coating before the material contacts the surface, the barrier coating drying in a time not longer than about 15 minutes when the slurry is applied as a 250 micron thick wet film and with the temperature at 73° F., 59% humidity, and air moving over the film at 90 feet per minute.

13. A method of preventing weld spatter from adhering to a surface, the method comprising:
coating the surface with a slurry comprising a mineral material in water, the slurry containing from about 10% to about 70% solids by weight and not more than 1% by weight of a material that fumes or smokes when heated to 1000° F. for one minute; and
allowing the slurry to dry to form a barrier coating before the weld spatter contacts the surface, the barrier coating binding to the surface such that at least about 50 finger double rubs are required to reach the surface when the dry barrier coating is 30 microns thick.

14. A method according to claim 13 wherein from about 50 to about 200 finger double rubs are required to reach the surface.

15. A method of preventing weld spatter from adhering to a surface, the method comprising:
coating the surface with a slurry comprising a mineral material in water, the slurry containing from about 10% to about 70% solids by weight; and
allowing the slurry to dry to form a barrier coating before the weld spatter contacts the surface, the barrier coating binding to the surface such that at least about 50 finger double rubs are required to reach the surface when the dry barrier coating is 30 microns thick;
wherein the dried barrier coating produces substantially no fumes or smoke when heated to 1000° F. for one minute.

16. A method according to claim 15 wherein from about 50 to about 200 finger double rubs are required to reach the surface.

17. A method of preventing weld spatter from adhering to a surface, the method comprising:
coating the surface with a slurry comprising a mineral material in water, the slurry containing from about 10% to about 70% solids by weight and not more than 1% by weight of a material that smokes or fumes when heated to 1000° F. for one minute, wherein the surface is a surface of a welding machine or a surface of machinery away from the welding location; and
allowing the slurry to dry to form a barrier coating before the weld spatter contacts the surface.

18. A method of preventing weld spatter from adhering to a surface, the method comprising:
coating the surface with a slurry comprising a mineral material in water, the slurry containing from about 10% to about 70% solids by weight and not more than 1% by weight of a material that fumes or smokes when heated to 1000° F. for one minute; and
allowing the slurry to dry to form a barrier coating before the weld spatter contacts the surface, the barrier coating drying in a time not longer than about 15 minutes when the slurry is applied as a 250 micron thick wet film and with the temperature at 73° F., 59% humidity, and air moving over the film at 90 feet per minute.

19. A method of preventing weld spatter from adhering to a surface, the method comprising:
coating the surface with a slurry comprising a mineral material in water, the slurry containing from about 10% to about 70% solids by weight and not more than 1% by weight of a material that decomposes when heated to 1000° F. for one minute; and
allowing the slurry to dry to form a barrier coating before the weld spatter contacts the surface, the barrier coating binding to the surface such that at least about 50 finger double rubs are required to reach the surface when the dry barrier coating is 30 microns thick.

20. A method according to claim 19 wherein the dried barrier coating has substantially no decomposition when heated to 1000° F. for one minute.

* * * * *